United States Patent

Gesenhues et al.

[11] Patent Number: 5,451,870
[45] Date of Patent: Sep. 19, 1995

[54] SENSOR FOR MEASURING THE DIFFERENCE BETWEEN THE VELOCITY OF A CYLINDER AND A PISTON IN A DASHPOT

[75] Inventors: Ludger Gesenhues, Witten; Reinhard Hölscher, Salzkotten; Hans-Jürgen Hoffmann; Zhen Huang, both of Wuppertal; Klaus Schmidt, Bergisch-Gladbach, all of Germany

[73] Assignee: August Bilstein GmbH & Co. KG, Ennepetal, Germany

[21] Appl. No.: 927,122

[22] Filed: Aug. 7, 1992

[30] Foreign Application Priority Data

Aug. 12, 1991 [DE] Germany .................. 41 26 586.6

[51] Int. Cl.6 .................... G01P 3/52; G01B 7/14; B60G 17/08
[52] U.S. Cl. .................... 324/207.15; 280/707; 324/163; 324/207.22; 324/207.24
[58] Field of Search ............ 324/207.15, 207.16, 324/207.22, 207.24, 160, 163, 173, 174; 280/707; 92/5

[56] References Cited

U.S. PATENT DOCUMENTS

| | | | |
|---|---|---|---|
| 4,361,835 | 11/1982 | Nagy | 324/207.2 X |
| 4,719,419 | 1/1988 | Dawley | 324/207.22 |
| 4,879,511 | 11/1989 | Leon | 324/207.24 X |
| 4,883,150 | 11/1989 | Arai | 324/207.24 X |
| 5,009,450 | 4/1991 | Herberg et al. | 324/174 X |
| 5,191,283 | 3/1993 | Gesenhues | 324/174 |
| 5,233,293 | 8/1993 | Huang et al. | 324/207.22 X |

FOREIGN PATENT DOCUMENTS

| | | | |
|---|---|---|---|
| 3643290 | 6/1988 | Germany | 324/207.2 |
| 0079410 | 5/1982 | Japan | 324/207.22 |
| 0233303 | 9/1988 | Japan | 324/207.24 |

Primary Examiner—Gerard R. Strecker
Attorney, Agent, or Firm—Max Fogiel

[57] ABSTRACT

A sensor for measuring the difference between the velocity and/or position of a vibration-suppressing cylinder and that of a piston connected to a piston rod and moving back and forth inside the cylinder in a dashpot for motor vehicles. The sensor consists of a permanent magnet and of a winding in the form of a cylindrical coil and operating in conjunction with the magnet. The magnet is connected directly or indirectly to one of the mutually moving components and the winding is connected directly or indirectly to the other. The component that the magnet (5) rests against and the component that the winding (7) rests against constitute a complete circuit that carries the magnet's field.

6 Claims, 8 Drawing Sheets

SENSOR FOR MEASURING THE DIFFERENCE BETWEEN THE VELOCITY OF A CYLINDER AND A PISTON IN A DASHPOT

BACKGROUND OF THE INVENTION

The invention concerns a sensor for measuring the difference between the velocity of a cylinder and that of a piston that travels in and out of it at the end of a piston rod in a dashpot.

Such dashpots are employed as intermediates that transmit vibrations from a roadway to the body of the vehicle by way of the wheel suspension. Most of them are variable or regulated hydraulic dashpots, which ensure passenger comfort and maximum passenger safety.

Various parameters of motion, like the difference between the velocity of the body and that of the suspension, or the acceleration of the body, are measured in order to vary the level of vibration suppression exerted by a dashpot in accordance with the condition of the roadway for instance.

German Patent 3 909 190 describes a sensor that can be integrated into a dashpot to measure the difference between the velocity of the body and that of the suspension. This sensor comprises a winding that rests against or is accommodated in the wall of a protective jacket attached to the piston rod and of a permanent magnet in the cylinder's cap, which the rod extends through. When the roadway is irregular, the magnet's flux and its motion within the winding induces a voltage in the winding that is utilized as a signal representing the difference between the velocity of the piston and that of the cylinder and hence between the velocity of the body and that of the suspension.

This sensor, however, has a drawback. Either the jacket that accommodates the winding is made of a non-magnetic material or the winding itself acts as a jacket, wound out of an air coil and extrusion-coated with plastic. Such a winding can intersect only a few of the lines of force extending out of the magnet, and the voltage induced in the winding is not a precise measure of the difference between the velocity of the body and that of the suspension.

SUMMARY OF THE INVENTION

The object of the invention is accordingly a sensor for measuring the difference between the velocity of the piston and that of the cylinder, whereby the voltage induced in the winding is a very precise proportional measure of the difference and can accordingly be utilized as an actual value for controlling the dashpot's level of vibration suppression.

A very precise signal proportional to the difference between the velocity of the piston and that of the cylinder can be obtained when the magnet is permanently magnetized radially in relation to the piston rod and rests against the cylinder cap separated from the rest of the cylinder by a non-ferromagnetic material. If the cylinder itself is made of a non-ferromagnetic material, aluminum for example, the magnet can be integrated into the cap. Since the jacket that accommodates the winding against its inner surface is also of ferromagnetic material, the magnetic flux will travel through the polarized magnet, the piston rod, and the jacket, and will be intersected at a right angle by the winding, inducing in it a signal proportional to the difference in velocities. Leakage flux that could contaminate the results does not occur.

Just as precise results can be obtained in a dashpot with a sensor winding resting against the piston rod below a stroke limiter when the radially polarized magnet rests against the inner surface of the cylinder. The opposite arrangement, with the sensor winding resting against the inner surface of the cylinder and the magnet against the piston rod below the stroke limiter, is also conceivable. The circuit for the magnetic flux in this case is constituted by the magnet, the piston rod, the cylinder, and the piston. If the piston consists of a non-ferromagnetic material, the magnetic circuit can be completed through the cylinder cap.

When the sensor winding rests against the outer surface of the cylinder, however, the cylinder must be made of a non-ferromagnetic material and the winding must be wrapped in a ferromagnetic material.

In two-cylinder dashpots, the cylinder that suppresses the vibrations is surrounded by an outer cylinder. In this event either the magnet or the winding in the equalization chamber can rest either against the outer surface of a non-magnetic cylinder or against the inner surface of the outer cylinder.

It is also possible in a two-cylinder dashpot for the sensor winding to rest against the outer surface of the outer cylinder and be wrapped in a ferromagnetic wrap. The outer cylinder must in this case of course be of non-ferromagnetic material.

BRIEF DESCRIPTION OF THE DRAWINGS

One embodiment of the invention will now be specified with reference to the drawing, wherein.

DESCRIPTION OF THE PREFERRED EMBODIMENTS

Figure 1:
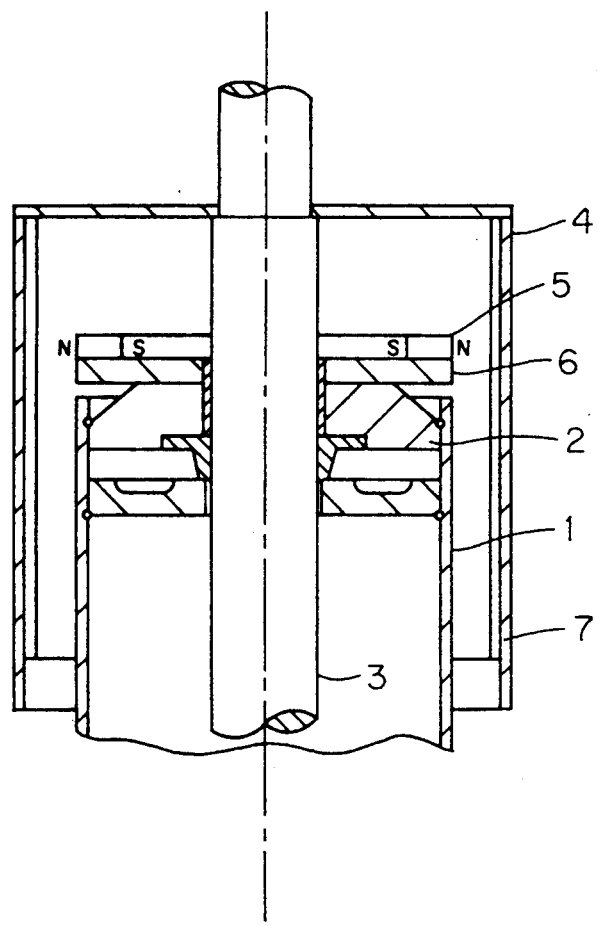
FIG. 1 is a section through part of a dashpot with a sensor winding resting against the protective jacket.

The hydraulic dashpot illustrated in section in FIG. 1 essentially comprises a vibration-suppressing cylinder 1 closed off by a cap 2 and a steel piston rod 3 extending through the cap with an unillustrated piston at its other end. A protective jacket 4, open at one end, has been mounted over cylinder 1 and surrounding piston rod 3.

A velocity-difference sensor is integrated into the dashpot and includes a permanent annular magnet 5 polarized radially with respect to piston rod 3. The magnet is magnetically separated from cylinder 1, which is usually of steel, by a disk 6 of non-magnetic material. If cylinder 1 and its cap 2 are of aluminum, disk 6 can be eliminated and magnet 5 can be integrated into the cap. A sensor winding 7 operates in conjunction with magnet 5 and rests against the inner surface of jacket 4, which is made of a ferromagnetic material, usually steel. The winding can extend all the way along the surface.

Figure 2:
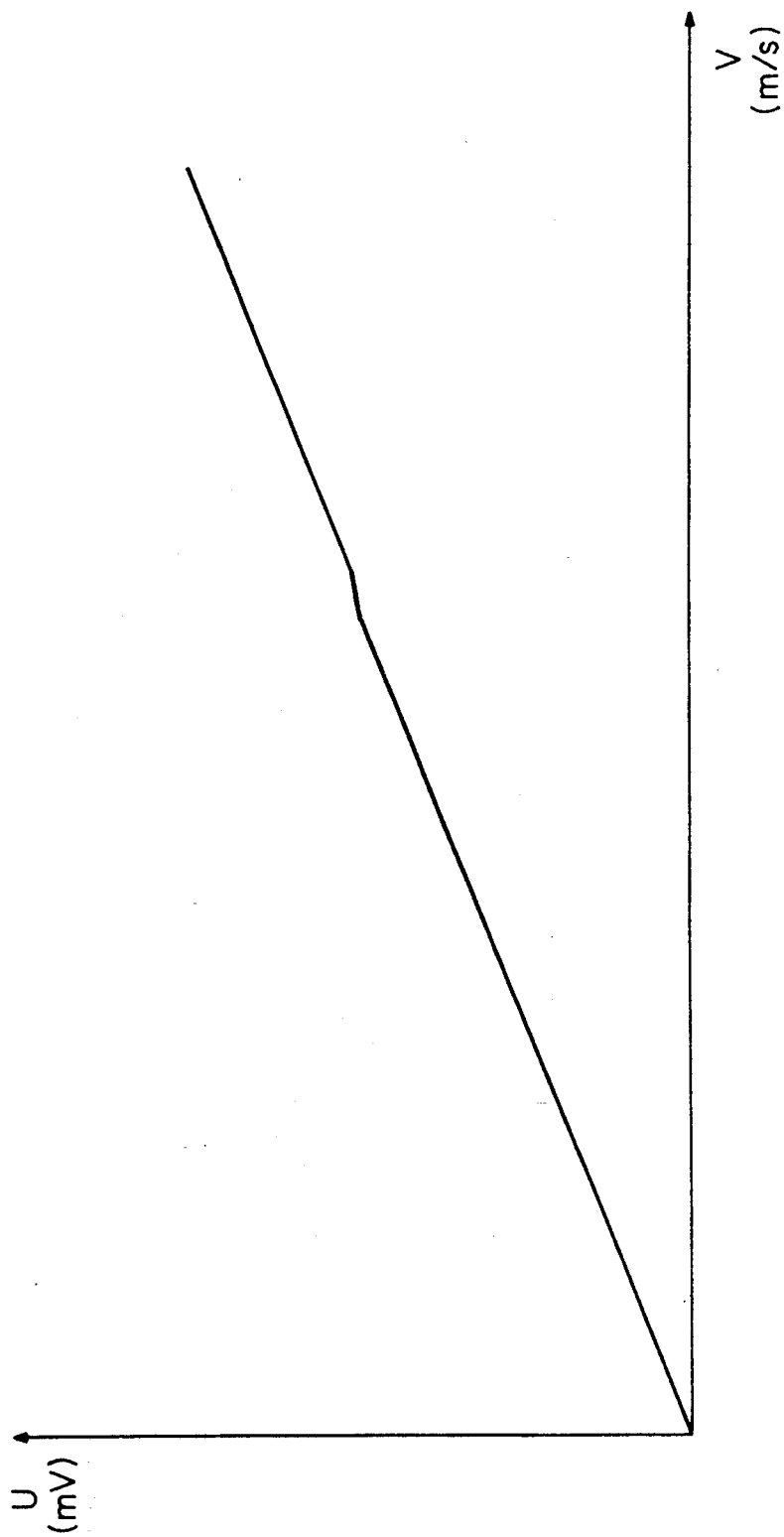
FIG. 2 is a graph of the induced voltage as a function of the difference v between the velocity of the body and that of the suspension.

When, due to an irregularity in the roadway, cylinder 1 moves relative to piston rod 3 and hence to winding 7, which operates in conjunction with it, the field around magnet 5 will induce a voltage in the winding. Due to the closed circuit between the radially polarized magnet and the jacket 4 that accommodates the winding, this voltage will be proportional to the difference between the velocity of cylinder 1 and that of the unillustrated piston and hence between the velocity of the body and that of the suspension. FIG. 2 illustrates induced voltage U in relation to the difference v in velocities.

When the dashpot lacks a protective jacket, winding 7 can rest against cylinder 1. In this event it may rest against either the inner or the outer surface.

Figure 3:
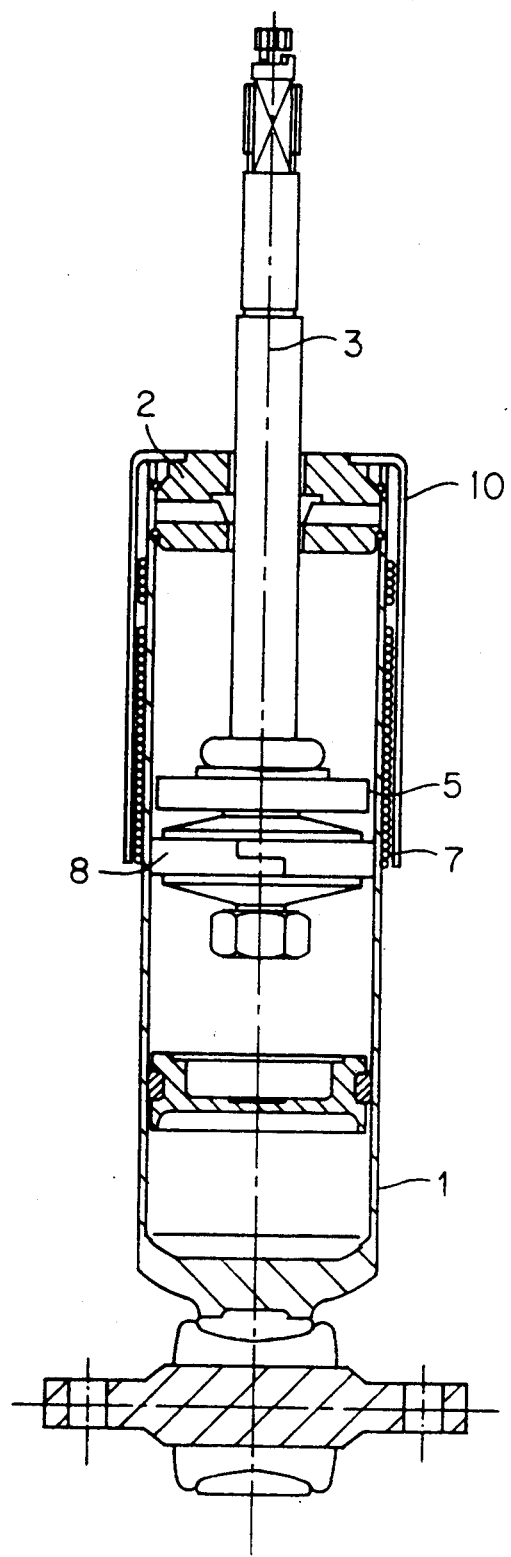
FIG. 3 illustrates a dashpot with a sensor winding resting against the cylinder and with a permanent magnet on the piston rod.

If winding 7 rests against the outer surface of cylinder 1 as illustrated in FIG. 3, the cylinder must be made of a non-magnetic material and the winding must be wrapped in a wrap 10 of ferromagnetic material to complete the magnetic circuit.

Figure 4:
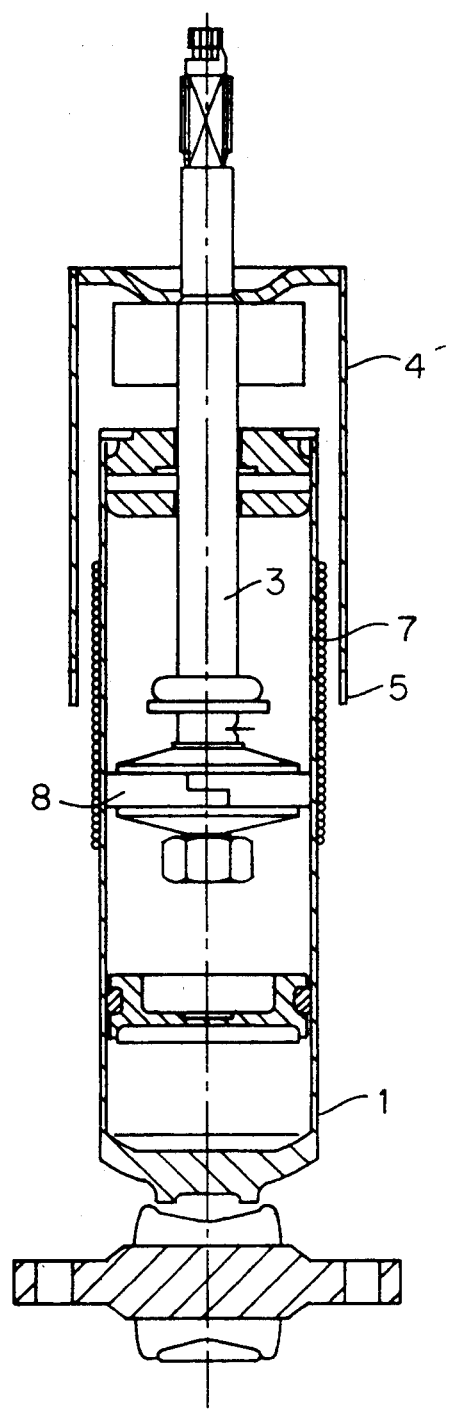
FIG. 4 illustrates a dashpot with a sensor with a winding resting against the cylinder and the magnet embedded in the outside.

FIG. 4 illustrates a one-cylinder dashpot with a winding 7 resting against the outer surface of vibration-suppressing cylinder 1. Permanent magnet 5 is a radially polarized annular magnet that rests against the inner surface of a jacket 4 made of ferromagnetic material and is accordingly indirectly connected to piston rod 3. The induction principle is the same. When cylinder 1 moves in relation to piston 8, a voltage proportional to the difference in velocities is induced in winding 7. If cylinder 1 is of non-magnetic material, the magnetic circuit must be completed by way of piston rod 3. If the cylinder is ferromagnetic, it can itself complete the circuit.

Figure 5:
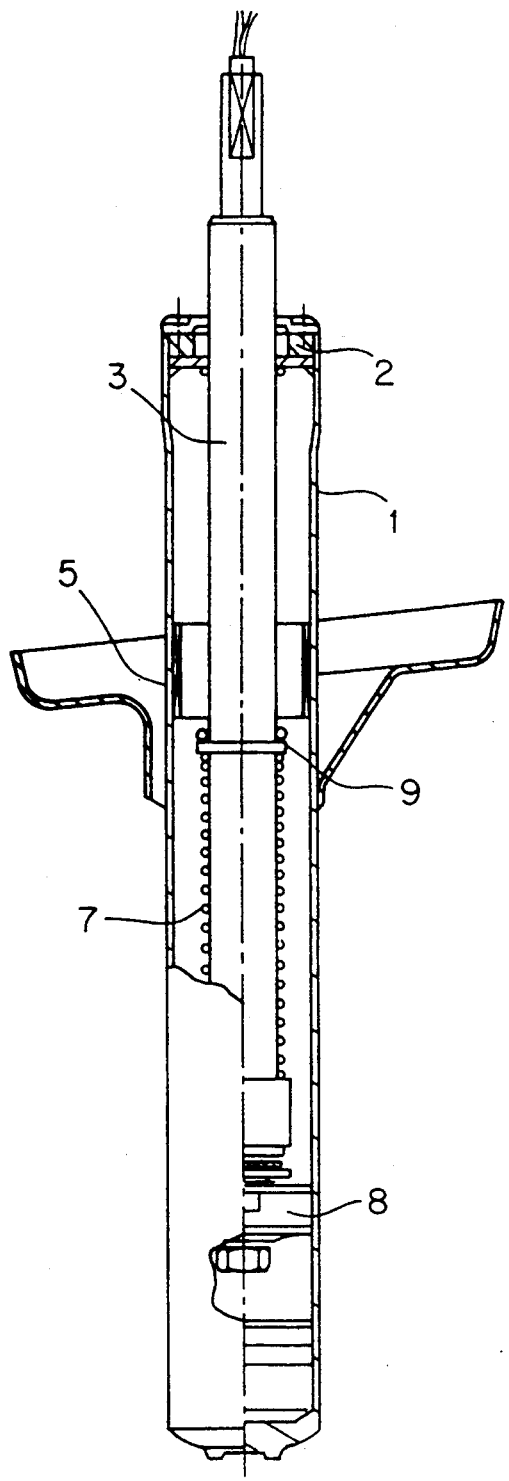
FIG. 5 illustrates a one-cylinder resilient strut with a sensor winding around the piston rod and a magnet resting against the inner surface of the cylinder.

FIG. 5 illustrates a sensor in a resilient strut. In a strut the winding can rest below a stroke limiter 9 and magnet 5 against the inner surface of cylinder 1. The circuit that carries the flux from magnet 5 comprises piston rod 3, piston 8, and the wall of cylinder 1. All components must be made of a ferromagnetic material.

Figure 6:
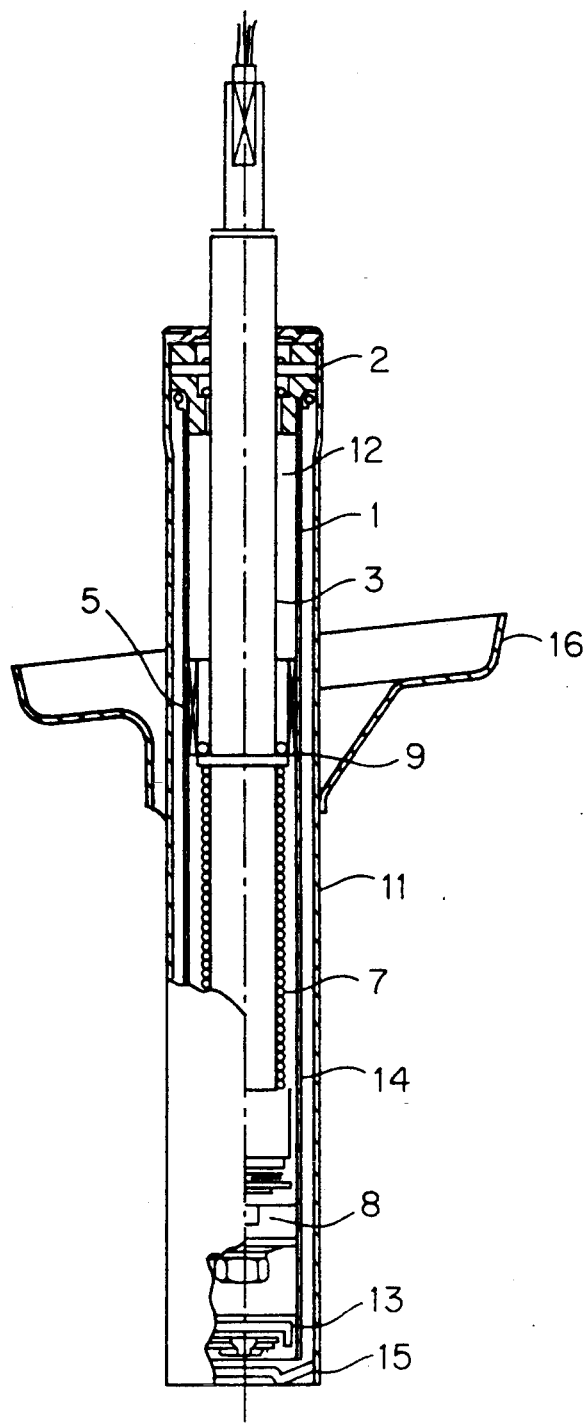
FIG. 6 illustrates a two-cylinder resilient strut with a sensor consisting of a winding around the piston rod and of a magnet connected to the vibration-suppressing cylinder.

The two-cylinder resilient strut illustrated in FIG. 6 consists of an operations chamber 12 accommodated in cylinder 1 and demarcated at the bottom by a valve 13 and at the top by cap 2. A piston rod 3 travels in and out through the cap and has a piston 8 mounted on it in chamber 12. Vibration-suppressing cylinder 1 is accommodated in an outer cylinder 11, leaving between them an equalization chamber 14. Operations chamber 12 is full of oil and equalization chamber 14 about half full of oil. Outer cylinder 11 connects cap 2 with a base 15 that supports valve 13 and has mounted on it a disk 16 that supports an unillustrated helical spring. The up-and-down motion of the wheel suspension is limited by the stroke limiter 9 on piston rod 3. A winding 7 in the form of a cylindrical coil rests against piston rod 3 below stroke limiter 9.

A radially polarized permanent annular magnet 5 surrounding winding 7 rests against the inner surface of cylinder 1. In this type of velocity-difference sensor, the magnetic circuit comprises cylinder 1, piston rod 3, piston 8, or cap 2.

If cylinder 1 is of non-magnetic material, magnet 5 can be positioned between its outer surface and the inner surface of outer cylinder 11.

Figure 7:
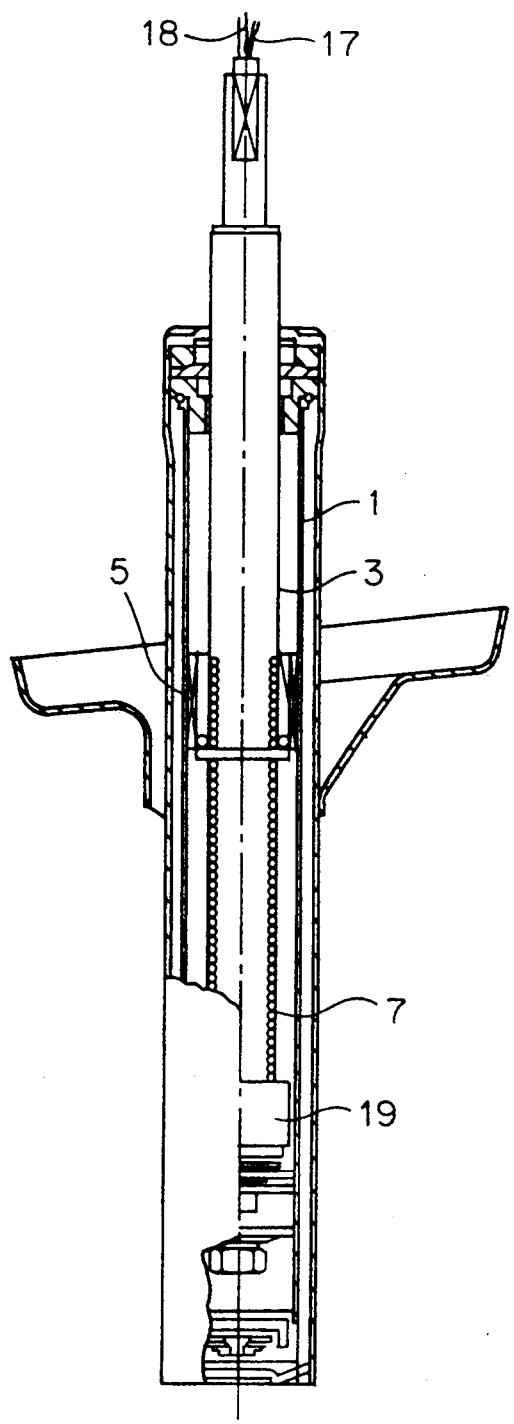
FIG. 7 illustrates a two-cylinder resilient strut with a sensor consisting of a winding accommodated inside a hollow piston rod and of a magnet connected to the vibration-suppressing cylinder.

The resilient strut illustrated in FIG. 7 is similar to the strut illustrated in FIG. 6. Piston rod 3 is made of a non-magnetic material, non-magnetic chrome-nickel-steel for example. Winding 7 is accommodated in a hollow piston rod 3. Leads 17 extend from the winding and leads 18 from a variable bypass 19 inside piston rod 3. The magnet 5 that induces the voltage rests in this case against the inner surface of vibration-suppressing cylinder 1.

Figure 8:
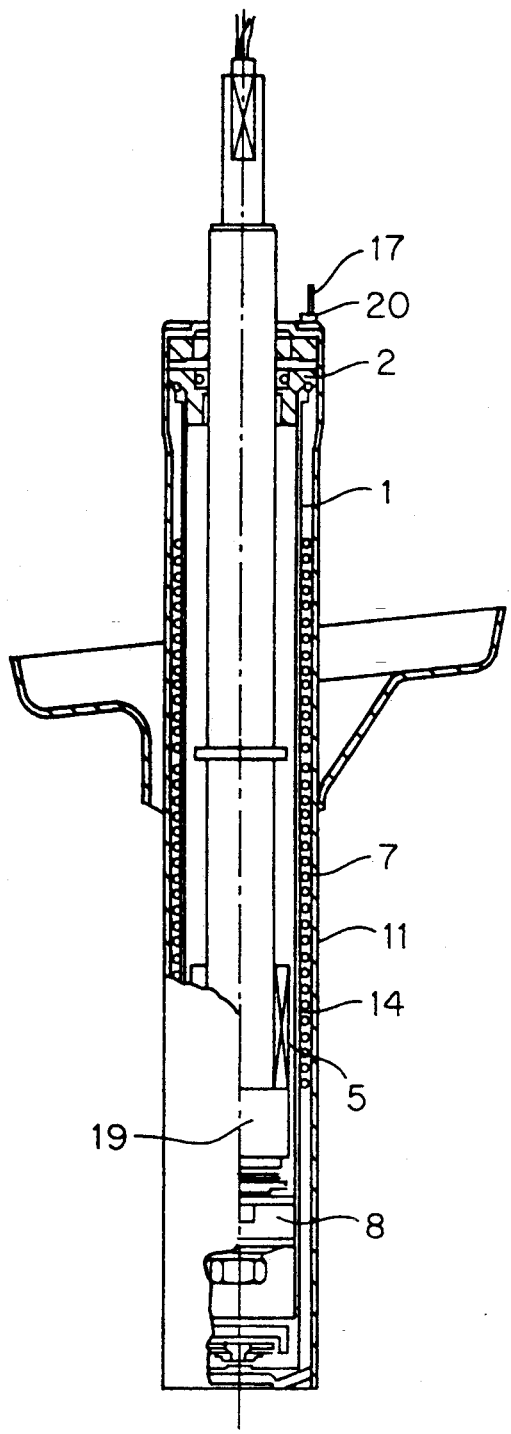
FIG. 8 illustrates a two-cylinder resilient strut with a sensor consisting of a winding resting against the outer surface of the vibration suppressing cylinder and of a magnet connected to the piston rod.

FIG. 8 illustrates a two-cylinder resilient strut with an oppositely oriented velocity-difference sensor. Winding 7 rests against the outer surface of a vibration-suppressing cylinder 1 of non-magnetic material. The winding could just as well, however, rest against its inner surface. The leads 17 in this embodiment extend out of the winding in equalization chamber 14 to a multiple plug 20 in cap 2. The preferably annular radially polarized magnet 5 surrounds piston rod 3 above bypass 19. Since outer cylinder 11 is of ferromagnetic material, the circuit for the magnetic field comprises piston rod 3, outer cylinder 11, and piston 8 or cap 2.

We claim:

1. A sensor for measuring the difference between either velocity or position or a combination thereof of a vibration-suppressing cylinder and a piston moving translationally back and forth inside said cylinder in a dashpot for motor vehicles, comprising: a disk shaped and radially polarized permanent magnet having an outer peripheral surface with a first magnetic pole and an inner rim surface with a second magnetic pole of polarity opposite to said first magnetic pole; a winding in form of a cylindrical coil operating cooperatively with said magnet to induce a voltage in the coil through relative translational motion between said magnet and said coil; said cylinder being a first component and said piston being a second component, said magnet being connected to one of said two components and said winding being connected to the other of said two components, said permanent magnet having a magnetic field passing through said coil and inducing said voltage in said coil when said permanent magnet moves translationally relative to said coil through relative translational motion of said two components, said voltage induced in said coil measuring said difference between velocity or position or combination of velocity and position of said cylinder and said piston.

2. A sensor as defined in claim 1, wherein said cylinder has a cap and said permanent magnet rests against said cap through nonmagnetic insulation between said cap and said magnet; a protective jacket with an inner surface surrounding said cylinder and spaced from said cylinder through an annular space between said cylinder and said inner surface of said jacket, said winding resting against said inner surface of said jacket and spaced from said cylinder; a piston rod connected to said piston and to said jacket, so that relative translational motion between said piston and said cylinder produces relative translational motion between said magnet and said coil, said piston rod and said jacket being of ferromagnetic material.

3. A sensor as defined in claim 1, including a piston rod connected to said piston, said magnet being polarized radially with respect to said piston rod.

4. A sensor as defined in claim 1, wherein said magnet is an annular magnet.

5. A sensor as defined in claim 1, wherein said magnet is a stack of individual annular magnets.

6. A sensor as defined in claim 1, wherein said magnet is a strip bent into a ring.

* * * * *